United States Patent [19]

Faulkner

[11] Patent Number: 4,967,551
[45] Date of Patent: Nov. 6, 1990

[54] TURBINE ENGINE

[75] Inventor: Robie Faulkner, Wallingford, Vt.

[73] Assignee: Sundstrand Corporation, Rockford, Ill.

[21] Appl. No.: 463,772

[22] Filed: Jan. 5, 1990

Related U.S. Application Data

[63] Continuation of Ser. No. 193,727, May 12, 1988, abandoned.

[51] Int. Cl.⁵ .............................................. F23R 3/32
[52] U.S. Cl. .................................... 60/39.36; 60/748
[58] Field of Search ................. 60/39.37, 748, 737, 60/39.36, 740, 738

[56] References Cited

U.S. PATENT DOCUMENTS

| | | | |
|---|---|---|---|
| 3,570,242 | 3/1971 | Leonardi et al. | 60/748 |
| 3,853,273 | 12/1974 | Bahr et al. | 60/748 |
| 3,972,182 | 8/1976 | Salvi | 60/748 |
| 4,162,611 | 7/1979 | Carvel et al. | 60/748 |
| 4,584,834 | 4/1986 | Koshoffer et al. | 60/748 |

*Primary Examiner*—Louis J. Casaregola
*Assistant Examiner*—Timothy S. Thorpe
*Attorney, Agent, or Firm*—Wood, Phillips, Mason, Recktenwald & Van Santen

[57] ABSTRACT

A turbine engine including a rotary compressor 10 to be driven by a turbine wheel 12 and provided with an annular combustor 36 including an outlet 44 whereby gases of combustion may be directed to a nozzle 46 to be directed against the turbine wheel 12 to drive the same. Fuel injectors each include a simple tube 70 having a cut off end 72 disposed in a ring-like mounting element 100 which in turn mounts a plurality of swirler vanes 106 which cooperate with a converger 94 having a central aperture 96 aligned with the end 72 of the tube 70 that provides highly stable combustion within the combustor 36.

7 Claims, 1 Drawing Sheet

TURBINE ENGINE

This application is a continuation of application Ser. No. 193,727, filed May 12, 1988, now abandoned.

FIELD OF THE INVENTION

This invention relates to a turbine engine, and more particularly, to improved fuel nozzle or injection structures for use in turbine engines.

BACKGROUND OF THE INVENTION

Provision of proper fuel injection structures in turbine engines has long been difficult. Fuel injection must be considered in connection with combustor geometry for any of a variety of reasons. For one, as fuel is injected through the fuel injector, it must burn in a stabilized fashion within a particular area of the combustor.

In addition, the distribution of fuel by the fuel injector must be such that hot spots within the combustor are not created as such hot spots lead to premature deterioration of the combustor.

It is also desirable that the injectors be such that full and complete combustion of the fuel occurs, at least to the extent that carbon build-up within the combustor will not occur. Such carbon build-up is undesirable in that it may increase the rate of absorption of radiant energy from the combusting fuel and lead to the development of hot spots. Perhaps more importantly, when carbon build-up occurs, ultimately fragments of the carbon will break free and exit the combustor to pass through the turbine nozzle to the turbine wheel. These structures may be eroded by the carbon particles and will commensurately have their lives shortened.

The present invention is directed to overcoming one or more of the above problems.

SUMMARY OF THE INVENTION

It is the principal object of the invention to provide a new and improved turbine engine. More specifically, it is an object of the invention to provide a turbine engine with a new and improved fuel injecting structure.

An exemplary embodiment of the invention achieves the foregoing in a turbine engine structure including a rotary compressor, a turbine wheel connected to the compressor for driving the same, and journal bearings journaling the compressor and turbine wheel for rotation about an axis. An annular combustor is disposed about the axis and includes an inner wall having an outlet for gases of combustion. An annular nozzle is disposed about the turbine wheel and in fluid communication with the outlet so that gases of combustion may be directed at the turbine wheel to drive the same. An annular outer wall for the combustor extends about the axis and about the inner wall in spaced relation thereto to define a space for cooling and combustion air. Means are provided to establish fluid communication between the compressor and the space to deliver compressed air to the space and there are provided a plurality of fuel injection nozzles, each generally parallel to the axis and located in the inner wall oppositely of the outlet. Each said injector includes a tube provided with a nozzle at an end thereof which serves as a fuel injecting opening, a mounting element having an opening snugly receiving the tube near its end for mounting the tube to the inner wall, and a plurality of swirler vanes which are located near the tube end. One side of the vanes is in fluid communication with the space to receive combustion air therefrom and the other side of vanes is in proximity to the tube end to cause a swirling stream of air to be generated thereat. An air stream converger is located about the vanes and includes a relatively flat, hollow frustoconical section with a central aperture centered at the tube end and spaced slightly therefrom in the direction of the outlet to cause swirling air to be directed inwardly across the end of the tube to enhance atomization thereat.

In a highly preferred embodiment, the injecting tube is a simple tube having a cut off end which is otherwise unmodified and serves as a fuel injection opening. Such a structure represents the ultimate in simplicity and may be manufactured at minimal expense.

The invention also contemplates that the vanes be in a circular array and have inner and outer diameters and that the central aperture have a diameter that is greater than the diameter of the tube and less than the inner diameter of the vanes.

In a highly preferred embodiment, each of the injectors further includes a dome mounted in the inner wall which in turn mounts the converger. A dome cooling cone extends radially outwardly from the converger in slightly spaced relation to a portion of the dome. In a highly preferred embodiment of the invention, the cooling cone has at least its lesser diameter sections more remote from the outlet than the tube end to minimize carbon build-up.

One embodiment of the invention contemplates that the converger include a generally hollow cylindrical section that mounts the radially outer ends of the vanes and merges into the relatively flat, hollow, frustoconical section.

In a highly preferred embodiment, the tube has a length so as to extend unbroken across the space between the inner and outer walls as well as through both the inner and outer walls and into the dome. As a result, there is no possible leakage location where fuel could leak into the space between the inner and outer walls which those skilled in the art will recognize as frequently a source of bleed air. Thus, the odor of vaporized fuel cannot contaminate bleed air.

Where a ring-like mounting element is utilized and includes a central opening for receipt of the tube, preferably, adjacent the side of the vane which faces the space there is provided a diverging, cone-like pilot recess for guiding the tube end into the central opening. This assists in assembly of the device, particularly where the tube has a length so as to extend completely across the space as mentioned above.

Other objects and advantages will become apparent from the following specification taken in connection with the accompanying drawings.

DESCRIPTION OF THE PREFERRED EMBODIMENT

Figure 1:
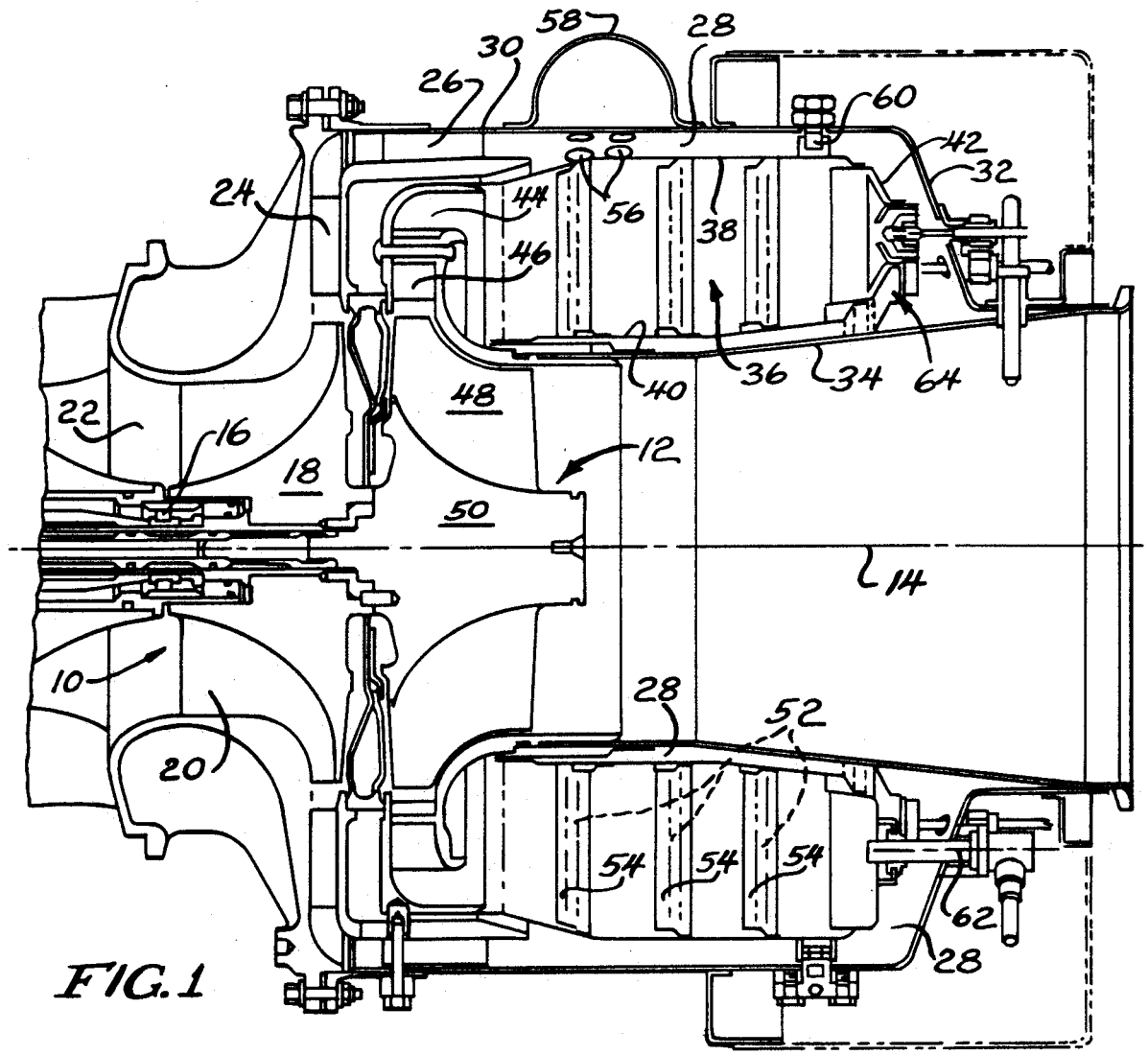
FIG. 1 is a sectional view of a turbine engine made according to the invention.

An exemplary embodiment of a turbine engine made according to the invention is illustrated in FIG. 1 and is seen to include a rotary compressor, generally designated 10, affixed to a rotary turbine wheel, generally designated 12, and journaled for rotation about an axis 14 by means of, for example, bearings 16. The compressor 10 includes a hub 18 provided with a plurality of axial intake, radial discharge blades 20. Air at an inlet 22 is compressed upon rotation of the compressor 10 and discharged through a conventional diffuser 24 and deswirl blades 26 into an annular space 28 about the axis 14. The annular space 28 is defined by an outer wall having a generally cylindrical section 30 merging with a generally radial section 32 and finally a partially cylindrical, partially conical section 34 which serves as an exhaust duct for gases leaving the turbine wheel 12.

The space 28 is further defined by an annular combustor, generally designated 36 which has an inner wall including a wall section 38 spaced radially inwardly from the outer wall section 30, a wall section 40 spaced radially outwardly from the exhaust duct 34 and an end section 42 spaced from the outer wall section 32.

Opposite the end section 42, the annular combustor 36 includes an outlet 44 in fluid communication with an annular nozzle 46 disposed about the turbine wheel 12 and adapted to direct gases of combustion from the combustor 36 against radial inflow, axial outflow blades 48 on a hub 50 defining the turbine wheel 12.

Along the length of the combustor 36, the same is provided with cooling slots on the centers designated 52 and which are covered by cooling strips 54. The slots 52 and strips 54 provide for the entry of compressed air from the rotary compressor 10 into the interior of the combustor 36 at desired intervals to cool the inner wall sections 38, 40 and 42.

At desired locations, the outer wall 28 may be provided with bleed air openings 56 in fluid communication with the interior of a duct 58. Thus, compressed air in the space 28 may be taken therefrom as bleed air for conventional purposes.

Mounted on the outer wall and extending to the combustor 36 is, for example, an igniter 60 of known construction.

Also provided at appropriate intervals may be one or more so-called start injectors 62 which are adapted to inject fuel into the combustor 36 only when the turbine is being started.

At equally angularly spaced locations about the wall section 44, injectors, generally designated 64, provide for fuel injection during normal operation. According to the invention, each injector 64 is generally parallel to the axis 14 and is made up of a simple tube 70 having a cut off end 72 which serves as a fuel injecting opening. The cut off end 72 is simply that. No steps are taken to provide it with a special configuration. The same is at most deburred following the cutting operation and possibly beveled on its outer surface to provide a pilot (not shown). Because the injector includes a simple tube 70, and yet provides highly desirable atomization, it will be appreciated that substantial cost reduction is achieved.

Figure 2:
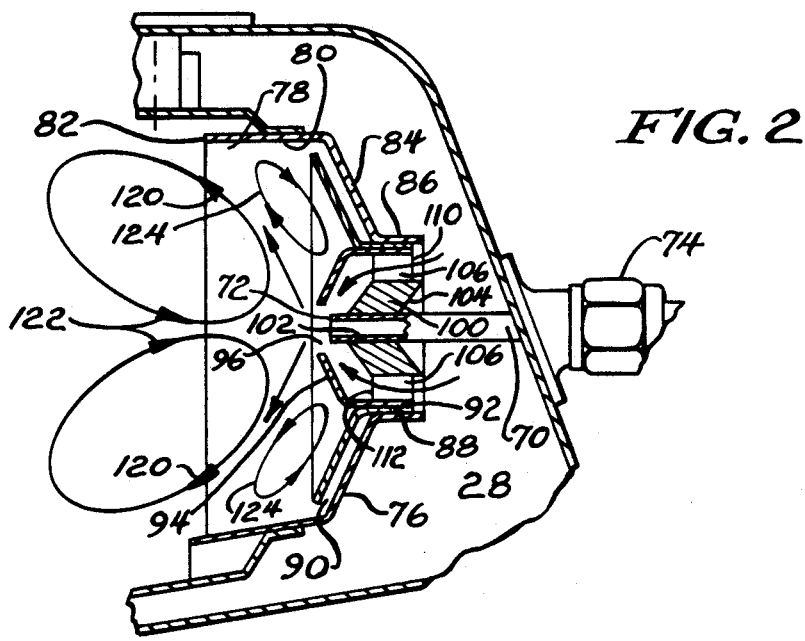
FIG. 2 is an enlarged, fragmentary sectional view of one injector that may be used in the turbine engine and made according to the invention.

In any event, the tube 70 is of sufficient length so as to extend through both the wall sections 32 and 42 and, in unbroken fashion, across the entire space 28 as can best be seen in FIG. 2. The tube 70 is coupled to the fuel injection system by a suitable fitting 74 but it will be appreciated that the same is located on the exterior side of the outer wall 30.

This means there is no possible leakage point within the space 28 as may be present in many other types of designs. This avoids one annoying difficulty where turbine engines may be used in, for example, aircraft. As is well known, bleed air from a turbine engine is frequently circulated to the cabin of the aircraft. If fuel had an opportunity to leak into the space 28, it could vaporize therein. Subsequently, when bleed air was removed from the space 28 via the openings 56, the fuel vapor would be circulated with it and would be circulated into the aircraft cabin, to the annoyance of the occupants therein. The present invention avoids that problem.

Each injector 64 includes a dome 76 best illustrated in FIG. 2. The dome 76 includes an almost cylindrical, but slightly frustoconical, skirt 78 which is disposed within an opening 80 in the wall 42 and secured in place as by brazing or the like. The skirt 78 includes an open end 82 facing the outlet 44 of the combustor. Oppositely of the open end, the skirt 78 merges into a relatively flat frustoconical section 84 which in turn merges into a cylindrical sleeve 86 adjacent its minor base.

Fitted within the sleeve 86 and mounted thereto as by brazing is a sleeve 88 which extends to a dome cooling cone 90. The dome cooling cone 90 is also a relatively flat cone and is slightly spaced from the frustoconical section 84 as best seen in FIG. 2. Moreover, the dome cooling cone 90 is fabricated such that corresponding rays along its surface and the surface of the frustoconical section 84 are roughly parallel.

Disposed within the sleeve 88 and secured thereto is a further cylindrical sleeve 92. The sleeve 92 serves to mount a shroud or converger 94 to the overall injector structure. In particular, a relatively flat, frustoconical, radially inwardly directed configuration including a central aperture 96 serves as the converger.

The aperture 96 is centered on the end 72 of the tube 70 and is located slightly toward the outlet 46 along the length of the combustor 36.

Located within the sleeve 92 is a ring-like mounting element 100 including a central opening 102 in which the tube 70 is snugly received near the end 72. One side of the mounting element 100, about the opening 102, and specifically the side facing the space 28, is provided with a diverging, conical pilot 104 to facilitate insertion of the tube 70 into the central opening 104. Alternatively and as mentioned earlier, or in addition the end 72 of the tube 70 may be beveled to provide a conical pilot thereon.

The outer diameter of the mounting element 100 is considerably less than the inner diameter of the sleeve 92 as is apparent from FIG. 2 and radially extending swirler vanes 106 are located in the resulting annulus. The swirler vanes 106 are mounted to both the mounting element 100 and the sleeve 92. They includes sides 110 in fluid communication with the space 26 and sides 112 adjacent the end 72 of the tube 70.

In a preferred embodiment, the diameter of the central aperture 96 is somewhat greater than that of the tube 70 but less than the inner diameter of the swirler vanes 106 (which is to say, greater than the outer diameter of the mounting element 100).

It should also be noted that at least the lesser diameter section the cooling cones 90 are located more remote from the outlet 46 than the central aperture 96.

In operation, fuel is directed to the interior of the tube 70 by a fuel injection system and expelled out of the end 72 in the direction of the central aperture 96. Compressed air from the space 28 will have substantial swirl imparted to it as it enters the combustor between the swirling vanes 106 and passes the end 72 of the tube 70 to flow out of the central aperture 96. The resulting stream of air and fuel will be generally cone-like flowing toward the outlet in the path indicated by arrow 120. As is well known, a recirculation zone indicated by arrows 122 will also exist and as a result, highly stabilized combustion will occur.

Though it is not known with certainty, it is believed that lesser recirculation patterns such as shown at 124 exist in close proximity to the cooling cone 90. Such recirculation zones tend to scrub the cooling cones 90 to prevent carbon build-up. In addition, the location of the central aperture 96 in relation to the cone 70 serves to prevent carbon build-up.

From the foregoing, it will be appreciated that a turbine engine made according to the invention provides highly desirable stabilized combustion without carbon build-up in a structure that is simple and economically manufactured.

I claim:

1. A turbine engine comprising:
   a rotary compressor;
   a turbine wheel connected to said compressor for driving the same;
   means journalling said compressor and said turbine wheel for rotation about an axis;
   an annular combustor disposed about said axis including an inner wall having an outlet for gases of combustion;
   an annular nozzle about said turbine wheel and in fluid communication with said outlet so that gases of combustion may be directed at said turbine wheel to drive the same;
   an annular outer wall for said combustor extending about said axis and about said inner wall in spaced relation thereto to define a space for cooling and combustion air;
   means establishing fluid communication between said compressor and said space for delivering compressed air to said space; and
   a plurality of fuel injection nozzles, each generally parallel to said axis and located in said inner wall oppositely of said outlet, each of said injectors including a simple tube including a fuel injection opening at an end thereof, a ring-like mounting element having a central opening snugly receiving said tube near said end, at least one said tube having a substantially uniform cross section at right angles to the tube axis over substantially the entire extent of said one tube through said space and at the fuel injection opening;
   a plurality of swirler vanes on said mounting element extending radially outwardly therefrom, one side of said vanes being in fluid communication with said space to receive combustion air therefrom, the other side of said vanes being in proximity to said tube end to cause a swirling stream of air to be generated thereat, an air stream converger including a generally hollow cylindrical section mounting the radially outer ends of said vanes and merging into a relatively flat, hollow frustoconical section with a central aperture centered at said tube end and space slightly therefrom in the direction of said outlet, a dome mounted in said inner wall and mounting said converger, and a dome cooling cone extending radially outward from said converger in slightly spaced relation to a portion of said dome.

2. The turbine engine of claim 1 wherein said central opening, adjacent said one side of said vanes so as to face said space includes a diverging pilot recess for guiding said tube end into said central opening.

3. The turbine engine of claim 1 wherein said tube has a length so as to extend unbroken across said space and through both said inner and outer walls into said dome.

4. The turbine engine of claim 1 wherein the diameter of said central aperture is less than the outer diameter of said ring-like mounting element.

5. A turbine engine comprising:
   a rotary compressor;
   a turbine wheel connected to said compressor for driving the same;
   means journalling said compressor and said turbine wheel for rotation about an axis;
   an annular combustor disposed about said axis including an inner wall having an outlet for gases of combustion;
   an annular nozzle about said turbine wheel and in fluid communication with said outlet so that gases of combustion may be directed at said turbine wheel to drive the same;
   an annular outer wall for said combustor extending about said axis and bout said inner wall in spaced relation thereto to define a space for cooling and combustion air;
   means establishing fluid communication between said compressor and said space for delivering compressed air to said space; and
   a plurality of fuel injection nozzles, each generally parallel to said axis and located in said inner wall oppositely of said outlet, each of said injectors including a simple tube having a cut off end serving as a fuel injection opening, a mounting element having an opening snugly receiving said tube near said end for mounting said tube to said inner wall, at least one of said tubes having a substantially uniform cross section at right angles to the tube axis over substantially the entire extent of said one tube through said space and at said cut off tube end;
   a plurality of swirler vanes near said tube end, one side of said vanes being in fluid communication with said space to receive combustion air therefrom, the other side of said vanes being in proximity to said tube end to cause a swirling stream of air to be generated thereat, and an air stream converger about said vanes and including a relatively flat, hollow frustoconical section with a central aperture centered at said tube end and spaced slightly therefrom in the direction of said outlet, to cause swirling air to be directed inwardly across said end to enhance atomization thereat.

6. The turbine of claim 5 wherein said vanes are in a circular array and have inner and outer diameters and said central aperture has a diameter that is greater than the diameter of said tube and less than the inner diameter of said vanes.

7. A turbine engine comprising:
   a rotary compressor;
   a turbine wheel connected to said compressor for driving the same;
   means journalling said compressor and said turbine wheel for rotation about an axis;
   an annular combustor disposed about said axis including an inner wall having an outlet for gases of combustion;
   an annular nozzle about said turbine wheel and in fluid communication with said outlet so that gases of combustion may be directed at said turbine wheel to drive the same;

an annular outer wall for said combustor extending about said axis and about said inner wall in spaced relation thereto to define a space for cooling and combustion air;

means establishing fluid communication between said compressor and said space for delivering compressed air to said space; and a plurality of fuel injection nozzles, each generally parallel to said axis and located in said inner wall oppositely of said axis and located in said inner wall oppositely of said outlet, each of said injectors including a simple tube having a cut off end serving as a fuel injection opening and having length sufficient to extend unbroken across said space and through said inner and outer walls, at least one of said tubes having a substantially uniform cross section at right angles to the tube axis over substantially the entire extent of said one tube through said space, a ring-like mounting element having a central opening provided with a conical pilot for guiding and snugly receiving said tube near said end; a plurality of swirler vanes on said mounting element extending radially outwardly therefrom, one side of said vanes being in fluid communication with said space to receive combustion air therefrom, the other side of said vanes being in proximity to said tube end to cause a swirling stream of air to be generated thereat, an air stream converger including a generally hollow cylindrical section mounting the radially outer ends of said vanes and merging a relatively flat, hollow frustoconical section with a central aperture that is smaller than the outer diameter of said mounting element and larger than the outer diameter of said tube and centered at said tube end and spaced slightly therefrom in the direction of said outlet, a dome mounted in said inner wall and mounting said converger, and a dome cooling cone extending radially outward from said converger in slightly spaced relation to a portion of said dome, said cooling cone having at least its lesser diameter section more remote from said outlet than said tube end.

* * * * *